United States Patent [19]

Long et al.

[11] Patent Number: 5,650,469

[45] Date of Patent: Jul. 22, 1997

[54] POLYESTER/POLYAMIDE BLEND HAVING IMPROVED FLAVOR RETAINING PROPERTY AND CLARITY

[75] Inventors: Timothy Edward Long, Blountville; Harold Blake Sprayberry, Kingsport; Steven Lee Stafford, Gray; Sam Richard Turner, Kingsport, all of Tenn.

[73] Assignee: Eastman Chemical Company, Kingsport, Tenn.

[21] Appl. No.: 548,162

[22] Filed: Oct. 25, 1995

[51] Int. Cl.[6] .................................................. C08L 67/02
[52] U.S. Cl. .................................................. 525/425
[58] Field of Search .................................................. 525/425

[56] References Cited

U.S. PATENT DOCUMENTS

| | | |
|---|---|---|
| 4,052,481 | 10/1977 | Asahara et al. . |
| 4,501,781 | 2/1985 | Kushida et al. . |
| 4,837,115 | 6/1989 | Igarashi et al. . |
| 5,258,233 | 11/1993 | Mills et al. . |
| 5,266,413 | 11/1993 | Mills et al. . |
| 5,340,884 | 8/1994 | Mills et al. . |

FOREIGN PATENT DOCUMENTS

| | | |
|---|---|---|
| 50-005735 | 1/1975 | Japan . |
| 50-005751 | 1/1975 | Japan . |
| 50-010196 | 2/1975 | Japan . |
| 50-029697 | 3/1975 | Japan . |
| 02001156 | 1/1990 | Japan . |
| 684537 A5 | 10/1994 | Switzerland . |

*Primary Examiner*—Patricia A. Short
*Attorney, Agent, or Firm*—Karen A. Harding; Harry J. Gwinnell

[57] ABSTRACT

The present invention comprises polyester blend compositions having improved flavor retaining properties and color, comprising:

(A) 98.0 to 99.95 weight percent of a polyester which comprises (1) a dicarboxylic acid component comprising repeat units from at least 85 mole percent terephthalic acid or naphthalenedicarboxylic acid derived from terephthalic acid or naphthalenedicarboxylic acid respectively; and (2) a diol component comprising repeat units from at least 85 mole percent ethylene glycol, based on 100 mole percent dicarboxylic acid and 100 mole percent diol; and (B) 2.0 to 0.05 weight percent of a polyamide; wherein the combined weights of (A) and (B) total 100 percent.

24 Claims, No Drawings

POLYESTER/POLYAMIDE BLEND HAVING IMPROVED FLAVOR RETAINING PROPERTY AND CLARITY

FIELD OF THE INVENTION

The container market for carbonated and still mineral water requires exceptionally low levels of acetaldehyde (AA) in the container side wall in order to avoid the diffusion of the AA into the water leading to an undesirable water taste. AA is an inherent side product which is generated during the polymerization melt phase and subsequent processing steps. In addition, variables such as catalyst selection influence the amount of residual AA. Despite the significant improvement in the PET presently produced, this level of AA is still perceived to be too high. In fact, taste testing has indicated that humans can taste 20 ppb differences in AA. Consequently, there has been significant interest in reducing the residual AA content as low as possible.

In addition to very low levels of residual AA in the bottle sidewall, the market also demands that the product color be as low as possible. The lack of significant bottle sidewall color permits the use of "natural" or colorless water bottles, and also facilitates the intentional addition of dyes to generate a desired color bottle. Bottle sidewall color is typically reported as a b* unit which reflects the level of yellow color in the bottle. For example, containers prepared from virgin PET resin have values ranging from 0.8–1.2 b* units. Consequently, significant attention has been devoted to the production of beverage containers which demonstrate both low AA and low color.

U.S. Pat. Nos. 5,258,233, 5,266,413, 5,340,884 disclose polyamide/PET homopolymer blends, PET/polyamide copolymers, and PET/polyamide based concentrates. However, the end products have AA and/or color levels which are still undesirable for certain applications.

The use of various polyamides to increase the gas barrier properties in polyethylene terephthalate resins is disclosed in U.S. Pat. Nos. 4,837,115, 4,052,481 and 4,501,781.

U.S. Pat. No. 4,837,115 discloses a thermoplastic composition containing polyethylene terephthalate and high molecular weight polyamides which act to reduce the residual acetaldehyde contained in the polyester. U.S. Pat. No. 4,837,115 states that the molecular weight of the polyamide is not critical so far as the polyamide has a film-forming property. Such polyamides, therefore, must have high enough molecular weights to form a film. It is well known in the art that polyamides having molecular weights of at least 12,000 are necessary to form a film.

SUMMARY OF THE INVENTION

The present invention comprises semi-crystalline polyester blend compositions having improved flavor retaining properties, comprising:

(A) 98.0 to 99.95 weight percent of a polyester which comprises (1) a dicarboxylic acid component comprising repeat units from at least 85 mole percent terephthalic acid or naphthalenedicarboxylic acid derived from terephthalic acid or naphthalenedicarboxylic acid respectively; and (2) a diol component comprising repeat units from at least 85 mole percent ethylene glycol, based on 100 mole percent dicarboxylic acid and 100 mole percent diol; and (B) 2.0 to 0.05 weight percent of a polyamide; wherein the combined weights of (A) and (B) total 100 percent.

The present invention further comprises a process for forming a polyester/polyamide blend comprising blending (A) about 80 to about 99 weight % of a base polyester comprising (1) a dicarboxylic acid component comprising repeat units from at least about 85 mole percent aromatic dicarboxylic acid selected from the group consisting of terephthalic acid, naphthalenedicarboxylic acid and mixtures thereof, wherein said acid is derived from terephthalic acid or naphthalenedicarboxylic acid respectively; and (2) a diol component comprising repeat units from at least about 85 mole percent ethylene glycol, based on 100 mole percent dicarboxylic acid and 100 mole percent diol; and B) about 1 to about 20 weight % of a concentrate comprising:

1) about 1 to about 99 weight % of a carrier resin comprising a dicarboxylic acid component comprising repeat units from at least about 60 mole percent aromatic dicarboxylic acid selected from the group consisting of terephthalic acid, naphthalenedicarboxylic acid and mixtures thereof, and a diol component comprising repeat units from at least about 50 mole percent ethylene glycol, based on 100 mole percent dicarboxylic acid and 100 mole percent diol; and (2) about 1 to about 99 weight% of a polyamide which displays a melting point below the melting point of said carrier resin.

DESCRIPTION OF THE INVENTION

This invention involves polyester/polyamide blends having surprisingly low AA and low color. By using the acid form of the acid component of the polyester instead of the ester form, the resulting polymer blends display lower AA and color than the previously produced blends. The present invention further discloses polyester/ polyamide blends which are formed by mixing a polyester base resin with a concentrate containing the polyamide. The desired AA and color properties are achieved when the acid based polyesters are used as the base polymer. Preferably, both the carrier and base resins are formed from polyesters formed from the acid form of the acid component of the polyester.

The polyester (A), of the present invention is selected from polyethylene terephthalate (PET), polyethylene naphthalenedicarboxylate (PEN) or copolyesters thereof. The acid component of polyester (A) contains repeat units from at least about 85 mole percent terephthalic acid, naphthlenedicarboxylic acid or mixtures thereof and at least about 85 mole percent ethylene glycol, based on 100 mole percent dicarboxylic acid and 100 mole percent diol.

When the acid component of the polyester composition is derived from the acid form of the acid component the amount of acetaldehyde (AA) generated is less that which is typically generated when the acid component is derived from the ester form and the color is much better. Accordingly, the base is made from the acid form of the acid component (i.e. terephthalic acid and not dimethylterephthalate). Where very low AA is required preferably both the base and carrier resin are made from the acid form of polyester. It should be understood that use of the corresponding acid anhydrides and acid chlorides of the acids is included in the term "acid form of the polyester".

The dicarboxylic acid component of the polyester may optionally be modified with up to about 15 mole percent of one or more different dicarboxylic acids. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid are: phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. Examples of dicarboxylic acids to be included with naphthalenedicarboxylic acid are: terephthalic acid, phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. Polyesters may be prepared from two or more of the above dicarboxylic acids.

In addition, the glycol component (A)(2), may optionally be modified with up to about 15 mole percent, of one or more different diols other than ethylene glycol. Such additional diols include cycloaliphatic diols preferably having 6 to 20 carbon atoms or aliphatic diols preferably having 3 to 20 carbon atoms. Examples of such diols to be included with ethylene glycol are: diethylene glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. Polyesters may be prepared from two or more of the above diols.

The resin may also contain small amounts of trifunctional or tetrafunctional comonomers such as trimellitic anhydride, trimethylolpropane, pyromellitic dianhydride, pentaerythritol, and other polyester forming polyacids or polyols generally known in the art.

Preferably the carrier and base resins of the present invention should have molecular weights which are sufficient to insure that bottles may be formed from the resin. More preferably the resins have I.V. which (inherent viscosity, measured at 25° C. using 0.5 g/dl) are between about 0.50 and about 1.3 dl/gm. as determined in a 60:40 g phenol:tetrachloroethane cosolvent.

The PET and PEN based polyesters of the present invention can be prepared by conventional polycondensation procedures well-known in the art. Such processes include direct condensation of the dicarboxylic acid(s) with the diol(s). The polyesters may also be subjected to solid state polymerization methods.

The second component of the present invention is a polyamide capable of decreasing the AA which is generated during the production of the base resin and subsequent processing steps. Suitable polyamides display a melting point below the melting point of the polyester (PEN, PET or blends thereof). Preferably said polyamide is selected from the group consisting of low molecular weight partially aromatic polyamides having a number average molecular weight of less than 15,000, low molecular weight aliphatic polyamides having a number average molecular weight of less than 7,000 and wholly aromatic polyamides.

Combinations of such polyamides are also included within the scope of the invention. By "partially aromatic polyamide" it is meant that the amide linkage of the partially aromatic polyamide contains at least one aromatic ring and a nonaromatic species.

The partially aromatic polyamides have an I.V. of less than about 0.8 dL/g. Preferably the I.V. of the partially aromatic polyamides is less than about 0.7 dL/g and the number average molecular weight is less than about 12,000.

The aliphatic polyamides have an I.V. of less than about 1.1 dL/g. Preferably the I.V. of the aliphatic polyamides is less than about 0.8 dL/g and the number average molecular weight is less than about 6,000.

Wholly aromatic polyamides comprise in the molecule chain at least 70 mole % of structural units derived from m-xylylene diamine or a xylylene diamine mixture comprising m-xylylene diamine and up to 30% of p-xylylene diamine and an α∈-aliphatic dicarboxylic acid having 6 to 10 carbon atoms, which are further described in Japanese Patent Publications No. 1156/75, No. 5751/75, No. 5735/75 and No. 10196/75 and Japanese Patent Application Laid-Open Specification No. 29697/75.

The composition or articles of the present invention may contain up to about two weight percent of the low molecular weight polyamides and preferably less than about one weight percent. It has been determined that the use of polyamides at greater than about two weight percent based on the weight of the polyester causes undesirable levels of haze.

Low molecular weight polyamides formed from isophthalic acid, terephthalic acid, cyclohexanedicarboxylic acid, meta- or para-xylylene diamine, 1,3- or 1,4-cyclohexane (bis)methylamine, aliphatic diacids with 6 to 12 carbon atoms, aliphatic amino acids or lactams with 6 to 12 carbon atoms, aliphatic diamines with 4 to 12 carbon atoms, and other generally known polyamide forming diacids and diamines can be used. The low molecular weight polyamides may also contain small amounts of trifunctional or tetrafunctional comonomers such as trimellitic anhydride, pyromellitic dianhydride, or other polyamide forming polyacids and polyamines known in the art.

Preferred low molecular weight partially aromatic polyamides include: poly(m-xylylene adipamide), poly(hexamethylene isophthalamide), poly(hexamethylene adipamide-co-isophthalamide), poly(hexamethylene adipamide-co-terephthalamide), and poly(hexamethylene isophthalamide-co-terephthalamide). The most preferred low molecular weight partially aromatic polyamide is poly(m-xylylene adipamide) having a number average molecular weight of about 4,000 to about 7,000 and an inherent viscosity of about 0.3 to about 0.6 dL/g.

Preferred low molecular weight aliphatic polyamides include poly(hexamethylene adipamide) and poly(caprolactam). The most preferred low molecular weight aliphatic polyamide is poly(hexamethylene adipamide) having a number average molecular weight of about 3,000 to about 6,000 and an inherent viscosity of 0.4 to 0.9 dL/g. Low molecular weight partially aromatic polyamides, are preferred over the aliphatic polyamides where clarity and dispersibility are crucial.

Preferred low molecular weight aliphatic polyamides include polycapramide (nylon 6), poly-ω-aminoheptanoic acid (nylon 7), poly-ω-aminonanoic acid (nylon 9), polyundecane-amide (nylon 11), polyaurylactam (nylon 12), polyethylene-adipamide (nylon 2,6), polytetramethylene-adipamide (nylon 4,6), polyhexamethylene-adipamide (nylon 6,6), polyhexamethylene-sebacamide (nylon 6,10), polyhexamethylene-dodecamide (nylon 6,12), polyoctamethylene-adipamide (nylon 8,6), polydecamethylene-adipamide (nylon 10,6), polydodecamethylene-adipamide (nylon 12,6) and polydodecamethylene-sebacamide (nylon 12,8).

The low molecular weight polyamides are generally prepared by melt phase polymerization from a diacid-diamine complex which may be prepared either in situ or in a separate step. In either method, the diacid and diamine are used as starting materials. Alternatively, an ester form of the diacid may be used, preferably the dimethyl ester. If the ester is used, the reaction must be carried out at a relatively low temperature, generally 80° to 120° C., until the ester is converted to an amide. The mixture is then heated to the polymerization temperature. In the case of polycaprolactam, either caprolactam or 6-aminocaproic acid can be used as a starting material and the polymerization may be catalyzed by the addition of adipic acid/hexamethylene diamine salt which results in a nylon 6/66 copolymer. When the diacid-diamine complex is used, the mixture is heated to melting and stirred until equilibration.

The molecular weight is controlled by the diacid-diamine ratio. An excess of diamine produces a higher concentration of terminal amino groups. If the diacid-diamine complex is prepared in a separate step, excess diamine is added prior to the polymerization. The polymerization can be carried out either at atmospheric pressure or at elevated pressures.

The process for preparing the polyester/polyamide blends of the present invention involve preparing the polyester and low molecular weight polyamide, respectively, by processes as mentioned previously. The polyester and polyamide are dried in an atmosphere of dried air or dried nitrogen, or under reduced pressure. The polyester and polyamide are mixed and subsequently melt compounded, for example, in a single or twin screw extruder. Melt temperatures must be at least as high as the melting point of the polyester and are typically in the range of 260°–310° C. Preferably, the melt compounding temperature is maintained as low as possible within said range. After completion of the melt compounding, the extrudate is withdrawn in strand form, and recovered according to the usual way such as cutting. Instead of melt compounding, the polyester and polyamide may be dry-blended and heat-molded or draw-formed into plastic articles.

The polyamide can be added in the late stages of polyester manufacture. For example, the polyamide can be blended with the molten polyester as it is removed from the polycondensation reactor, before it is pelletized. This method, however, is not desirable if the polyester/polyamide blend will be subjected to solid state polymerization since undesirable color and/or haze may develop during extended time at elevated temperatures.

The polyamide may also be added as part of a polyolefin based nucleator concentrate where clarity is not critical such as in crystallized thermoformed articles. The polyamide may also be as a component of a polyester concentrate. The concentrate carrier resin may use either the acid or ester form of the acid component of the polyester. Preferably the carrier resin is derived from the acid form.

Generally the concentrate comprises about 1 to about 99 weight % of a carrier resin comprising a dicarboxylic acid component comprising repeat units from at least about 60 mole percent aromatic dicarboxylic acid selected from the group consisting of terephthalic acid, naphthalenedicarboxylic acid and mixtures thereof, and a diol component comprising repeat units from at least about 50 mole percent ethylene glycol, based on 100 mole percent dicarboxylic acid and 100 mole percent diol and about 1 to about 99 weight% of a polyamide described above. More preferably the carrier resin is about 20 to about 99 and most preferably about 50 to about 99 weight percent.

Generally between about 1 and about 20 weight percent of the concentrate is added to the base resin. More preferably about 1 to about 10 weight percent of the concentrate is added. It should also be understood that the base resin may contain small amounts of the ester form of the acid component, so long as the total amount of the ester form of the polyester/polyamide blend does not exceed about 20 weight %, and preferably not more than about 10 weight %.

The blends of this invention serve as excellent starting materials for the production of moldings of all types by extrusion or injection molding. Specific applications include various packaging applications such as thermoformed or injection molded trays, lids and cups; injection stretch blow-molded bottles, film and sheet; extrusion blow-molded bottles and multilayer articles. Examples of package contents include, but are not limited to, food, beverages, and cosmetics.

Many other ingredients can be added to the compositions of the present invention to enhance the performance properties of the blends. For example, crystallization aids, impact modifiers, surface lubricants, denesting agents, stabilizers, antioxidants, ultraviolet light absorbing agents, metal deactivators, colorants such as titanium dioxide and carbon black, nucleating agents such as polyethylene and polypropylene, phosphate stabilizers, fillers, and the like, can be included herein. All of these additives and the use thereof are well known in the art and do not require extensive discussions. Therefore, only a limited number will be referred to, it being understood that any of these compounds can be used so long as they do not hinder the present invention from accomplishing its objectives.

The compositions of the present invention display better color than those disclosed in U.S. Pat. No. 5,258,233. Because less color is generated dyes either are not required for masking purposes or are required in lesser amounts. However, should color be desirable colorants may be added. The colorant can be added to either component of the blend during polymerization or added directly to the blend during compounding. If added during blending, the colorant can be added either in pure form or as a concentrate. The amount of a colorant depends on its absorptivity and the desired color for the particular application. A preferred colorant is 1-cyano-6-(4-(2-hydroxyethyl) anilino)-3-methyl-3H-dibenzo(F,I,J)-isoquinoline-2,7-dione used in an amount of from about 2 to about 15 ppm.

Desirable additives also include impact modifiers and antioxidants. Examples of typical commercially available impact modifiers well-known in the art and useful in this invention include ethylene/propylene terpolymers, styrene based block copolymers, and various acrylic core/shell type impact modifiers. The impact modifiers may be used in conventional amounts from 0.1 to 25 weight percent of the overall composition and preferably in amounts from 0.1 to 10 weight percent of the composition. Examples of typical commercially available antioxidants useful in this invention include, but are not limited to, hindered phenols, phosphites, diphosphites, polyphosphites, and mixtures thereof. Combinations of aromatic and aliphatic phosphite compounds may also be included.

It has been surprisingly found that by using the acid form of the acid component of the polyester and adding a polyamide, the resulting polyesters display surprisingly low AA content and good color. This was particularly surprising as the addition of polyamide is known to deleteriously effect the color of the resultant polyesters.

EXAMPLE

Preparation of polyamide

A mixture of 58.4 g (.4 mole) adipic acid and 71.5 g of distilled water were placed in a 500 mL flask, then purged about 60 minutes with nitrogen. Quickly, 57.75 g m-xylylenediamine was added to the flask. The flask was equipped with an inlet for nitrogen, a metal stirrer, and a short distillation column. Then the flask was placed in a Belmont metal bath already heated to 115° C. and the contents of the flask were heated at 115° C. for 30 minutes. Then the temperature was raised progressively to 275° C. over 25 minutes. After reaching 275° C. and a clear melt, maintained 275° C. for about 30 minutes. A low melt viscosity, clear polyamide was obtained. Crystalline off-white on cooling. The polymer had an inherent viscosity of 0.64 (PM-95), amine endgroups of 0.13 meq/g, COOH endgroups of 0.045 meq/g, and a melting endotherm at 241° C.

Example 1

Preparation DMT PET/polyamide concentrate.

PET 9921 derived from dimethylterephthalate (DMT) and ethylene glycol (available from Eastman Chemical Company) was dried for 6 hours at 250° F. (122° C.) in a tray drier. The polyamide (0.7 lb) and 14.3 lb of PET (I.V. of about 0.73 dL/g.), were dry blended, extruded, and pelletized at a melt temperature of 520° F. (273° C.) using a Werner & Pfleiderer twin-screw extruder fitted with a 30 mm screw. Temperature settings on the extruder for the barrel and the die were 490° F. (256° C.) and 500° F. (262° C.) respectively.

Example 2

Preparation PTA PET/polyamide concentrate.

PET 9921 derived from terephthalic acid (PTA) and ethylene glycol (from Eastman Chemical Company) was dried for 6 hours at 250° F. (122° C.) in a tray drier. The polyamide (0.7 lb) and 14.3 lb of PET (I.V. of about 0.73 dL/g.), were dry blended, extruded, and pelletized at a melt temperature of 520° F. (273° C.) using a Werner & Pfleiderer twin-screw extruder fitted with a 30 mm screw. Temperature settings on the extruder for the barrel and the die were 490° F. (256° C.) and 500° F. (262° C.) respectively.

Examples 3–14

The polyester compositions shown in Table 1 were injection molded on a Cincinnati Milacron preform injection molding machine under the conditions listed below.

| Mold Size 1.5 1 | | | |
|---|---|---|---|
| Temperature (zones 1, 2 and nozzle) | 273° C. | | |
| Temperature (mold entrance) | 1°C. | | |
| Pressure (psig) | | Cycle (sec) | |
| Boost | 860–1010 | Boost | 17.0 |
| Hold | 1600 | Hold | 18.0 |
| Back | 200 | mold open | 3.0 |
| Idle | 0 | Pst pullback | 0.3 |
| High clamp | 150 | shot size | 3.4 |
| | | cushion | 0.25 |
| low clamp | 75 | cure | 23.0 |

The injection molding machine was run with an screw speed of 80 prm and an external motor pressure of 800 psig.

The base resin was dried in a dehumidifying desiccant dryer at 150° C. for approximately 16 hours. The concentrate was dried in smaller dryers at 100° C. for approximately 16 hours. The base resin was hand blended with the concentrate at the a 50:1 base resin:concentrate ratio immediately prior to putting into the extruder hopper. The barrel was emptied of the previous material and five shots of resin were used to purge the barrel before collecting samples. All samples were stored in dark plastic bags in a freezer at –20° C. until submitted for testing. The preforms were stored for one-day and reheat blow molded on the a reheat blow molding machine.

Letdowns of the concentrate consisting of the concentrate into the base polyester resulted in the polyamide contents shown in column 4. Several preforms were made. The AA in a random preform in each blend composition shown was measured and is shown in the fifth column. Bottles were blown from three random preforms in each composition and the bottle sidewall color was measured. The average bottle sidewall color is shown in the sixth column, below. The figures shown in Table 1 below are prefaced by the word "about".

TABLE 1

| Ex. # | Base | Conc. | wt % PA | AA (ppm) | Color (b*) |
|---|---|---|---|---|---|
| | DMT | none | 0 | 4.24 | 1.34 |
| 3 | DMT | DMT | 0.09 | 3.32 | 2.33 |
| 4 | DMT | DMT | 0.25 | 0.54 | 3.70 |
| 5 | DMT | DMT | 0.50 | 0.27 | 5.15 |
| 6 | DMT | PTA | 0.09 | 3.21 | 2.23 |
| 7 | DMT | PTA | 0.25 | 0.62 | 3.27 |
| 8 | DMT | PTA | 0.50 | 0.33 | 5.41 |
| | PTA | none | 0 | 3.67 | 0.99 |
| 9 | PTA | PTA | 0.09 | 2.11 | 1.80 |
| 10 | PTA | PTA | 0.25 | 0.57 | 2.57 |
| 11 | PTA | PTA | 0.50 | 0.23 | 3.80 |
| 12 | PTA | DMT | 0.09 | 2.59 | 1.45 |
| 13 | PTA | DMT | 0.25 | 0.50 | 3.11 |
| 14 | PTA | DMT | 0.50 | 0.29 | 3.98 |

PTA = terephthalic acid
DMT = dimethylterephthalate

The results shown in Table 1 clearly show that the polyesters made from PTA base polyester display both lower AA (except for Example 11, which is comparable) and lower color than those made from DMT base polyester. Humans can detect 20 ppb differences in AA and 0.5 differences in b*. Surprisingly, the present invention provides polyesters that display lower AA and a 5 to 35% (0.16 to 1.44) improvement in color (b,). Prior to the present invention reductions in AA came at the expense of increased color as shown by Examples 3 through 5.

What is claimed is:

1. Polyester compositions having improved flavor retaining properties and low color, comprising:
   (A) about 98.0 to about 99.95 weight percent of a polyester which comprises
   (1) a dicarboxylic acid component comprising repeat units from at least about 85 mole percent aromatic dicarboxylic acid selected from the group consisting of terephthalic acid, naphthalenedicarboxylic acid and mixtures thereof, wherein said acid is derived from terephthalic acid or naphthalenedicarboxylic acid respectively; and
   (2) a diol component comprising repeat units from at least about 85 mole percent ethylene glycol, based on 100 mole percent dicarboxylic acid and 100 mole percent diol; and (B) about 2.0 to about 0.05 weight percent of a polyamide; wherein the combined weight percents of (A) and (B) total 100 percent, wherein said polyester compositions display a b* of less than about 4.

2. The composition of claim 1 wherein said polyamide is selected from the group consisting of low molecular weight partially aromatic polyamides having a number average molecular weight of less than 15,000, low molecular weight aliphatic polyamides having a number average molecular weight of less than 7,000 and wholly aromatic polyamides.

3. The composition of claim 1 wherein the polyamide comprises a fully aliphatic polyamide selected from the group consisting of polycapramide (nylon 6), poly-ω-aminoheptanoic acid (nylon 7), poly-ω-aminononanoic acid (nylon 9), polyundecane-amide (nylon 11), polyaurylactam (nylon 12), polyethylene-adipamide (nylon 2,6), polytetramethylene-adipamide (nylon 4,6), polyhexamethylene-adipamide (nylon 6,6), polyhexamethylene-sebacamide (nylon 6,10), polyhexamethylene-dodecamide (nylon 6,12), polyoctamethylene-adipamide (nylon 8,6), polydecamethylene-adipamide (nylon 10,6), polydodecamethylene-adipamide (nylon 12,6) and polydodecamethylene-sebacamide (nylon 12,8).

4. The compositions of claim 2 wherein said partially aromatic polyamides have an I.V. of less than about 0.8 dL/g.

5. The compositions of claim 2 wherein said polyamide contains at least one partially aromatic polyamide having an I.V. of less than about 0.7 dL/g and a number average molecular weight of less than about 12,000.

6. The compositions of claim 2 wherein said polyamide contains at least one aliphatic polyamide having an I.V. of less than about 1.1 dL/g.

7. The composition of claim 6 wherein said at least one aliphatic polyamide has an I.V. of less than about 0.8 dL/g and said number average molecular weight is less than about 6,000.

8. The compositions of claim 1 wherein said polyamide further comprises small amounts of trifunctional or tetrafunctional comonomers selected from the group consisting of trimellitic anhydride, pyromellitic dianhydride and polyamide forming polyacids and polyamines.

9. The composition of claim 2 wherein said low molecular weight partially aromatic polyamide is selected from the group consisting of poly(m-xylylene adipamide), poly(hexamethylene isophthalamide), poly(hexamethylene adipamide-co-isophthalamide), poly(hexamethylene adipamide-co-terephthalamide), and poly(hexamethylene isophthalamide-co-terephthalamide).

10. The composition of claim 2 wherein said low molecular weight partially aromatic polyamide is poly(m-xylylene adipamide) having a number average molecular weight of about 4,000 to about 7,000 and an inherent viscosity of about 0.3 to about 0.6 dL/g.

11. The composition of claim 1 wherein said polyamide comprises at least one low molecular weight aliphatic polyamide selected from poly(hexamethylene adipamide) and poly(caprolactam).

12. The composition of claim 11 wherein said polyamide comprises poly(hexamethylene adipamide) having a number average molecular weight of about 3,000 to about 6,000 and an inherent viscosity of 0.4 to 0.9 dL/g.

13. The composition of claim 1 wherein said dicarboxylic acid component further comprises up to about 15 mole percent a second dicarboxylic acid selected from the group consisting of aromatic dicarboxylic acids having 8 to 14 carbon atoms, aliphatic dicarboxylic acids having 4 to 12 carbon atoms, cycloaliphatic dicarboxylic acids having 8 to 12 carbon atoms and mixtures thereof.

14. The composition of claim 13 wherein said dicarboxylic acid is terephthalic acid and said second dicarboxylic acid is selected from phthalic acid, isophthalic acid, 2,6-naphthalenedicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid and mixtures thereof.

15. The composition of claim 13 wherein said dicarboxylic acid is 2,6-naphthalenedicarboxylic acid and said second dicarboxylic acid is selected from terephthalic acid, phthalic acid, isophthalic acid, cyclohexanedicarboxylic acid, cyclohexanediacetic acid, diphenyl-4,4'-dicarboxylic acid, succinic acid, glutaric acid, adipic acid, azelaic acid, sebacic acid and mixtures thereof.

16. The composition of claim 1 wherein said glycol further comprises at least one additional diol selected from the group consisting of cycloaliphatic diols having 6 to 20 carbon atoms, aliphatic diols having 3 to 20 carbon atoms or mixtures thereof.

17. The composition of claim 16 wherein said additional diol is selected from the group consisting of diethylene glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane and mixtures thereof.

18. The composition of claim 1 wherein up to about 15 weight % of said dicarboxylic acid component is derived from an ester form of said terephthalic acid or naphthalenedicarboxylic acid.

19. The composition of claim 1 wherein up to about 10 weight % of said dicarboxylic acid component is derived from an ester form of said terephthalic acid or naphthalenedicarboxylic acid.

20. A process for forming a blend comprising; blending
(A) about 80 to about 99 weight % of a base polyester comprising
(1) a dicarboxylic acid component comprising repeat units from at least about 85 mole percent aromatic dicarboxylic acid selected from the group consisting of terephthalic acid, naphthalenedicarboxylic acid and mixtures thereof, wherein said acid is derived from terephthalic acid or naphthalenedicarboxylic acid respectively; and
(2) a diol component comprising repeat units from at least about 85 mole percent ethylene glycol, based on 100 mole percent dicarboxylic acid and 100 mole percent diol; and
B) about 1 to about 20 weight % of a concentrate comprising:
1) about 1 to about 99 weight % of a carrier resin comprising a dicarboxylic acid component comprising repeat units from at least about 60 mole percent aromatic dicarboxylic acid selected from the group consisting of terephthalic acid, naphthalenedicarboxylic acid and mixtures thereof, and a diol component comprising repeat units from at least about 50 mole percent ethylene glycol, based on 100 mole percent dicarboxylic acid and 100 mole percent diol; and (2) about 1 to about 99 weight % of a polyamide which displays a melting point below the melting point of said carrier resin and said blend displays a b* of less than about 4.

21. The method of claim 20 wherein said polyamide is selected from the group consisting of low molecular weight partially aromatic polyamides having a number average molecular weight of less than 15,000, low molecular weight aliphatic polyamides having a number average molecular weight of less than 7,000 and wholly aromatic polyamides.

22. The method of claim 20 wherein said polyamide is selected from the group consisting of low molecular weight partially aromatic polyamides having a number average molecular weight of less than 15,000, low molecular weight aliphatic polyamides having a number average molecular weight of less than 7,000.

23. The method of claim 21 wherein said carrier resin dicarboxylic acid is derived from terephthalic acid or naphthalenedicarboxylic acid.

24. A process for minimizing color in a polyester composition comprising the step of incorporating about 2.0 to about 0.05 weight percent of a polyamide into about 98.0 to about 99.95 weight percent of a polyester which comprises (1) a dicarboxylic acid component comprising repeat units from at least about 85 mole percent aromatic dicarboxylic acid selected from the group consisting of terephthalic acid, naphthalenedicarboxylic acid and mixtures thereof, wherein said acid is derived from terephthalic acid or naphthalenedicarboxylic acid respectively; and (2) a diol component comprising repeat units from at least about 85 mole percent ethylene glycol, based on 100 mole percent dicarboxylic acid and 100 mole percent diol; wherein said polyester composition displays a b* of less than about 4.

* * * * *